P. THOMAS.
Grain-Tallies.
No. 196,603 — Patented Oct. 30, 1877.
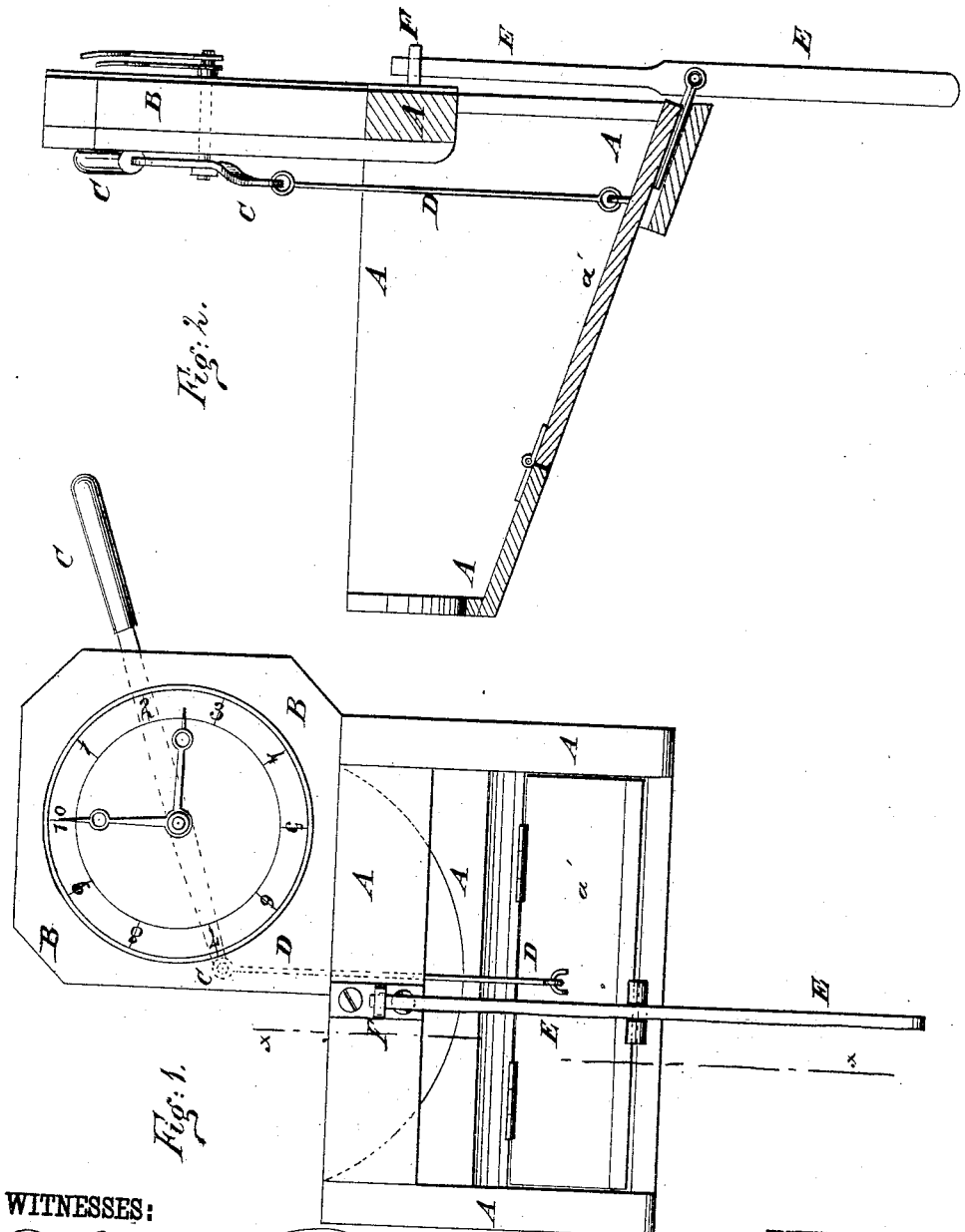

UNITED STATES PATENT OFFICE.

PHILLIP THOMAS, OF NORTH HURON, NEW YORK, ASSIGNOR TO HIMSELF AND ALVAH H. SEAVEY, OF SAME PLACE.

IMPROVEMENT IN GRAIN-TALLIES.

Specification forming part of Letters Patent No. 196,603, dated October 30, 1877; application filed September 22, 1877.

*To all whom it may concern:*

Be it known that I, PHILLIP THOMAS, of North Huron, in the county of Wayne and State of New York, have invented a new and useful Improvement in Grain Tally or Register, of which the following is a specification:

Figure 1 is a front view of my improved device. Fig. 2 is a vertical section of the same taken through the line $x\ x$, Fig. 1.

Similar letters of reference indicate corresponding parts.

The object of this invention is to furnish an improved grain tally or register which shall be so constructed that the basket or measure cannot be removed without operating the register, and which shall be simple in construction and convenient and accurate in use.

The invention consists in the combination of the pivoted connecting-bar and the pivoted or hinged sliding bar with the hinged bottom of the hopper, and with the lever that operates the register, as hereinafter fully described.

A represents a hopper, which receives the grain from the separator-spout or other place, and to which is attached a register, B, constructed in the usual way, of wheels and pawls, provided with a dial-plate and index-figures, and operated by a lever, C.

To the forward end of the operating lever C is pivoted the upper end of the connecting-rod D, the lower end of which is pivoted to the forward part of the movable bottom or door $a'$ of the hopper A. The rear edge of the bottom $a'$ is hinged to the stationary part of the bottom of the hopper A or to the lower edge of its rear side.

To the forward edge of the hinged bottom $a'$ of the hopper A is pivoted or hinged the middle part of the bar E, the upper end of which passes through a guide-keeper, F, attached to the upper part of the front of the hopper A, and its lower end projects downward.

In using the device, the basket or measure to receive the grain is placed beneath the hopper A, and the bottom $a'$ is lowered to allow the grain to flow out by operating the lever C.

When the basket is full the hinged bottom $a'$ is raised to interrupt the flow of the grain by again operating the lever C. When the bottom $a'$ is lowered to allow the grain to flow out, the lower end of the bar E enters the basket or measure, so that the said basket or measure cannot be removed without raising the bottom $a'$, and the movement of the lever C to raise the bottom $a'$ operates the register B and makes a tally.

Having thus described my invention, what I claim as new, and desire to secure by Letters Patent, is—

The combination of the pivoted connecting-rod D and the pivoted or hinged sliding bar E with the hinged bottom $a'$ of the hopper A and with the lever C that operates the register B, substantially as herein shown and described.

PHILLIP THOMAS.

Witnesses:
JACOB A. BENDER,
JOHN PETTENGILL.